(12) United States Patent
Neuling

(10) Patent No.: US 6,206,610 B1
(45) Date of Patent: Mar. 27, 2001

(54) ONE OPERATOR SYSTEM FOR PAINTING CURVED ROAD STRIPING PATTERNS

(76) Inventor: William V. Neuling, 4700 St. Johns Rd., Greenville, IN (US) 47124

( * ) Notice: Subject to any disclaimer, the term of this patent is extended or adjusted under 35 U.S.C. 154(b) by 0 days.

(21) Appl. No.: 09/375,483

(22) Filed: Aug. 17, 1999

Related U.S. Application Data

(63) Continuation-in-part of application No. 08/948,979, filed on Oct. 10, 1997, now Pat. No. 5,947,637, which is a continuation-in-part of application No. 08/912,779, filed on Aug. 18, 1997, now Pat. No. 6,027,281, which is a continuation-in-part of application No. 08/647,597, filed on Mar. 13, 1996, now Pat. No. 5,718,534.

(51) Int. Cl.[7] .......................... E01C 23/07; E01C 23/16; G09G 5/00; G02B 27/14
(52) U.S. Cl. ............................ 404/84.05; 404/94; 345/8; 359/630
(58) Field of Search ....................... 404/94, 75, 84.05, 404/84.2, 84.8; 345/8; 359/630

(56) References Cited

U.S. PATENT DOCUMENTS

| | | | |
|---|---|---|---|
| 2,974,875 | * | 3/1961 | Brown, Jr. . |
| 3,101,175 | * | 8/1963 | Brown . |
| 3,286,928 | * | 11/1966 | Mitchell . |
| 3,614,314 | * | 10/1971 | Rossire ................................. 348/115 |
| 3,882,268 | * | 5/1975 | Ogawa et al. ....................... 348/148 |
| 5,200,844 | * | 4/1993 | Suvada ................................. 349/11 |
| 5,718,534 | * | 2/1998 | Neuling ................................. 404/94 |
| 5,903,395 | * | 5/1999 | Rallison et al. ..................... 359/630 |
| 5,947,637 | * | 9/1999 | Neuling ................................. 404/94 |
| 5,991,085 | * | 11/1999 | Rallison et al. ..................... 359/630 |
| 6,027,281 | * | 2/2000 | Neuling ................................. 404/75 |

* cited by examiner

Primary Examiner—Eileen D. Lillis
Assistant Examiner—Gary S. Hartmann
(74) Attorney, Agent, or Firm—Breiner & Breiner

(57) ABSTRACT

A mobile vehicle mounted highway striping system is provided for single operator driving and controlling of the stripe painting operation. Tracking control systems are provided for striping about curved vehicle paths. Automated tracking systems correct tracking errors with the only interactivity of the operator being the steering function of aligning the vehicle path with a designated striping pattern path. A video monitor comparing the striping vehicle position relative to a designated striping path is worn as a headpiece by the driver. Thus, a semi-transparent video tracking pattern displays lateral positioning of a stripe being painted by the moving vehicle as the driver keeps eyes directed upon the roadway. Automatic tracking around curves is provided. The painting vehicle is steered to follow a designated path position on the video monitor.

9 Claims, 3 Drawing Sheets

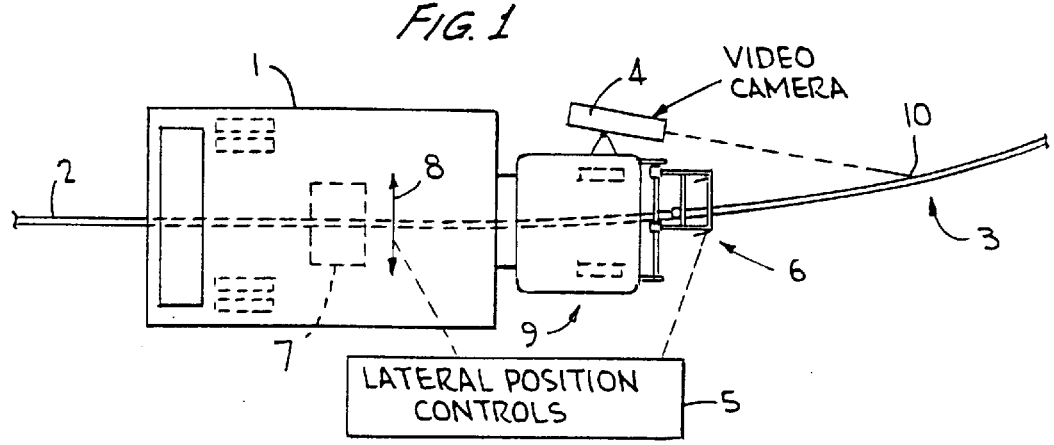
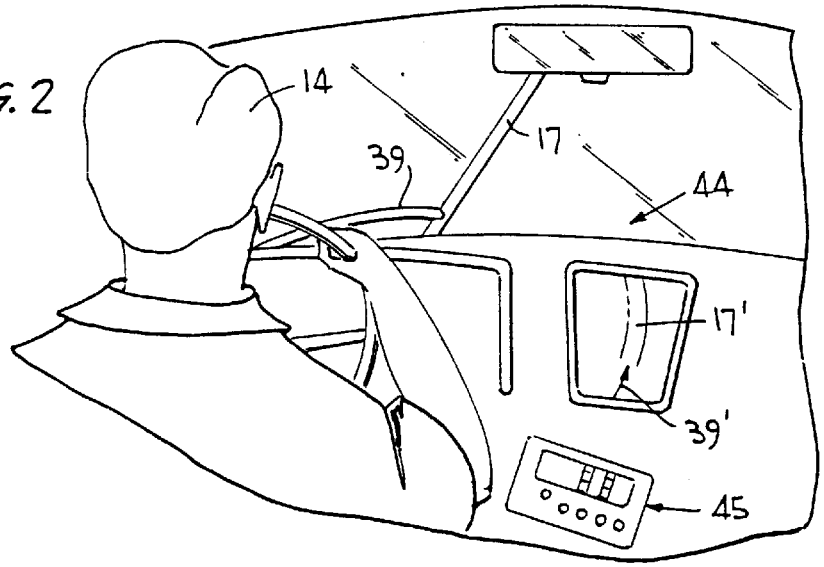
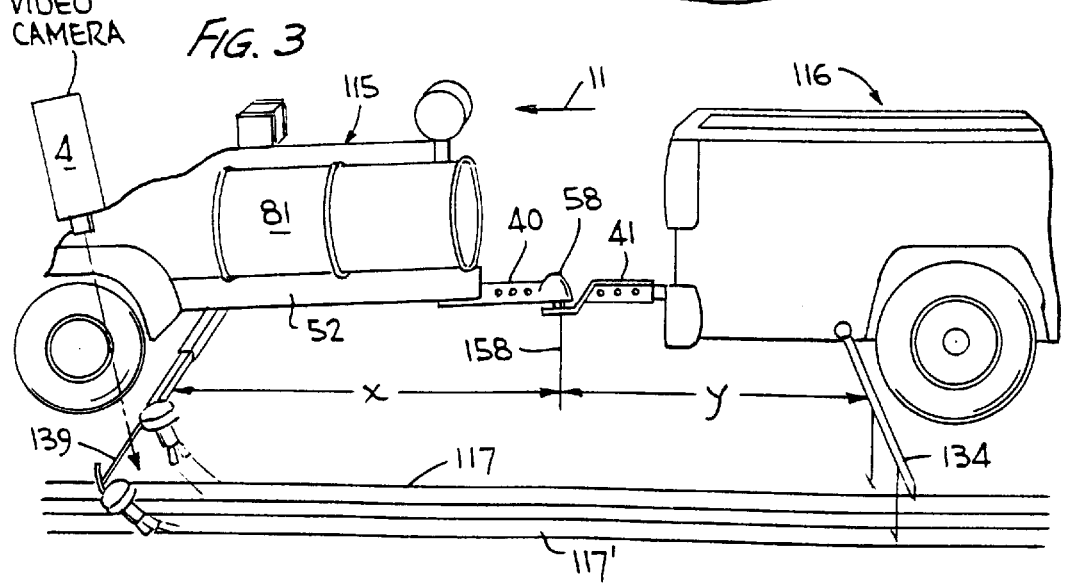

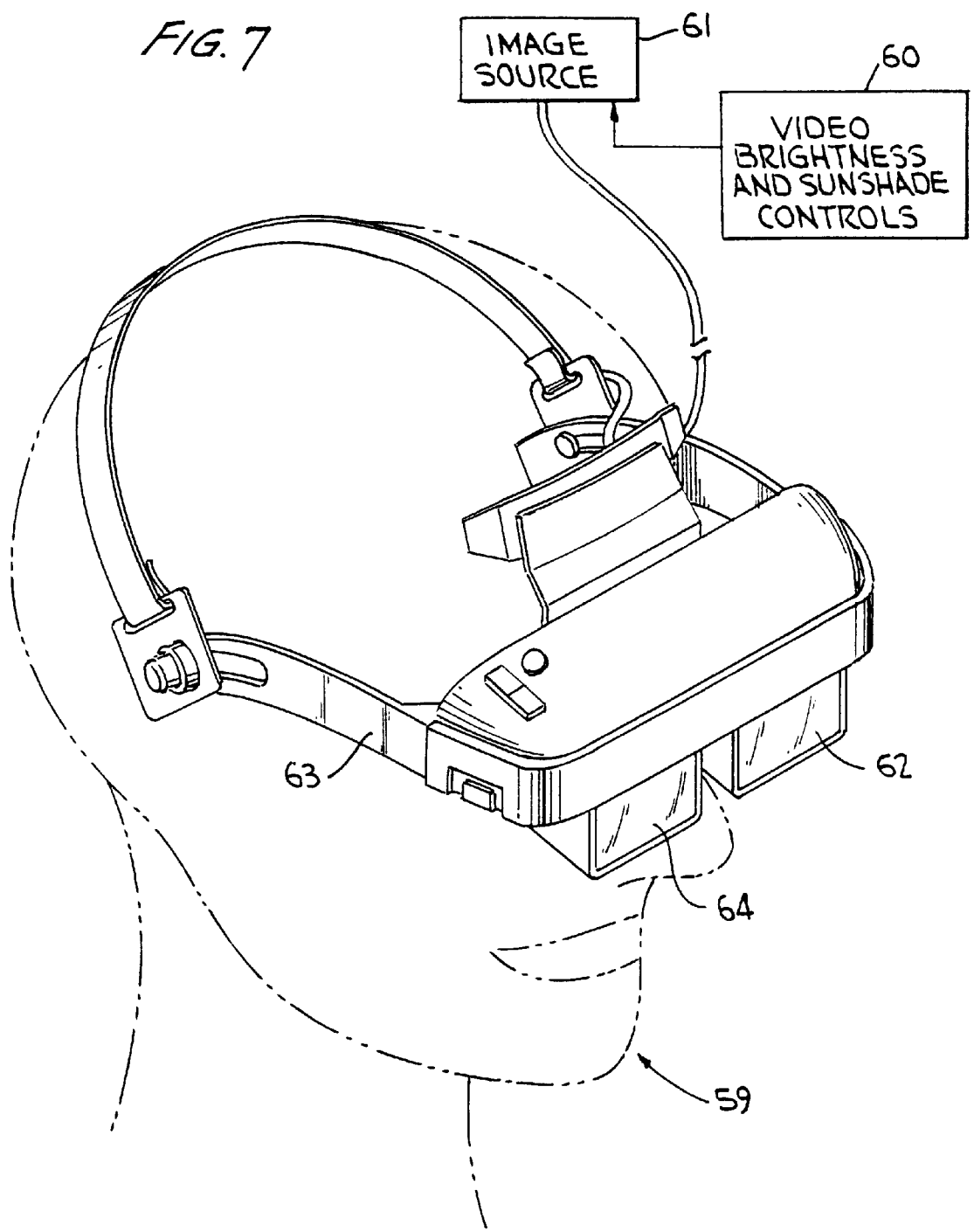

ONE OPERATOR SYSTEM FOR PAINTING CURVED ROAD STRIPING PATTERNS

This is a continuation-in-part of my patent application 08/948,979, filed Oct. 10, 1997, for AUTOMATIC TRACKING AROUND CURVED PATTERNS FOR PAINT STRIPERS, now U.S. Pat. No. 5,947,637 issued Sep. 7, 1999, which in turn is a continuation-in-part of Ser. No. 08/912,779, filed Aug. 18, 1997 for ARTICULATED TRACTOR-PAINT STRIPER SYSTEM FOR TWO-LAYER STRIPING, now U.S. Pat. No. 6,027,281 issued Feb. 22, 2000, which is a continuation-in-part of application Ser. No. 08/647,597 filed Mar. 13, 1996, now U.S. Pat. No. 5,718,534 issued Feb. 17, 1998.

TECHNICAL FIELD

This invention relates to paint striping systems for tracking paint stripes around curved painting patterns and more particularly it relates to single operator control of a paint striping vehicle for driving and controlling paint striping system quality.

BACKGROUND ART

In order to permit a vehicle driver to both drive and control painting of stripes along a highway from the vehicle cab while driving to follow a designated painting path, such as typically formulated by a previously painted stripe, a set of pre-aligned markers, or the edge of the road, there have been developed driver's video monitoring systems for monitoring a designated path position to aid the driver in steering the striper vehicle to accurately paint the stripe along the designated path. For example, C. F. Brown, Jr. in U.S. Pat. No. 3,101,175, Aug. 20, 1963 for ROAD STRIPING MACHINE WITH ELECTRONIC SIGHT has a video monitor in the truck cab for monitoring the truck position relative to the designated striping pattern to be followed.

Another example is a commercial highway striping system available from Graco, Inc., Minneapolis, Minn. with a truck cab mount video monitor viewing a pointer in front of the vehicle. Thus, the single driver-painter steers to locate the pointer on a designated path such as a formerly painted roadway stripe while viewing the video monitor in the cab.

However, these systems have no provisions for tracking deviations incurred when the painting vehicle rounds curved stripe patterns because the viewed reference point is separated from the striping gun position, and thus precisely locates the painted stripe on the designated pattern only for straight line striping.

Both these systems also pose the serious problem of driving safety by requiring the operator when driving the painting vehicle down the roadway to divide viewing time and mental attention to tracking coordination between the roadway being driven, the video monitor in the cab and the painting system controls in the cab. A significant problem is posed in viewing a video monitor in bright sunlight, which is a significant safety problem that may interrupt a driver's focus on safe driving down the roadway while taking a more concentrated look at a dim viewing monitor.

Furthermore, in towed trailer or rear mount truck paint striping systems, there is a significant tracking problem in painting stripes having a curved pattern, since the rear end does not track around a curve similarly to the front end of the truck where the driver sights and follows a striping pattern such as a previously painted roadway stripe.

As evidenced by W. R. Mitchell in U.S. Pat. No. 3,286,928, Nov. 22, 1966 for HYDRAULIC COMPENSATION OF HIGHWAY STRIPING EQUIPMENT, the problem of compensating for mistracking encountered in following highway stripe markers about curves in the highway when rear painting gun mounts are mounted behind a truck is treated and solved by employment of a hydraulically driven servo system linked to the truck steering system to laterally move the paint striper gun with rotation of the steering wheel over a pattern compensating for the tendency to mistrack.

This system however cannot be adapted to a variety of striping vehicles.

Other systems of compensation require steering by a second striper person riding a steerable trailer being towed behind the truck, such as the trailer disclosed in J. P. Oakley's U.S. Pat. No. 3,540,358 of Aug. 21, 1968 for MARKER BUTTON SETTER. The requirement of a two man painting crew, one to drive and one to steer is too labor intensive to use for many competitive striping operations.

Other guidance systems for paint stripers include U.S. Pat. No. 5,052,854, M. Corres, et al., Oct. 1, 1991 for HIGHWAY GUIDANCE VEHICLE SYSTEMS and U.S. Pat. No. 5,059,061, H. Stenemann, et al., Oct. 22, 1991 for TRUCK MOUNTED PAVEMANT MARKING APPLICATOR.

While these systems are controlled by a single operator, they cannot track the newly painted stripe when the vehicle is rounding a curve.

Thus, this invention has the objectives of providing a striping system that compensates for tracking errors encountered in curved striping patterns that achieves high speed roadway striping operations under control of a single driver-operator.

A more explicit objective of the invention is to provide a safer highway road striping system providing the driver with a performance monitor and striping controls that can be used without requiring the driver to take eyes off the road.

Other objects, features and advantages of the invention will be found throughout the following description, drawings and claims.

BRIEF DESCRIPTION OF THE INVENTION

This invention features a high speed highway paint striping system located in a vehicle driven by a person who monitors on a video monitor display the on-line performance of the ongoing striping in a given striping pattern including curved stripes to assure precise overlay of a further striping coat over a former striping pattern, wherein it is not necessary for the driver to take eyes off the road when driving the vehicle, viewing the monitor and controlling the paint striping overlay pattern.

In this one-operator system a video camera follows a striping pointer along a designated striping path pattern, which may be curved, permitting the operator while driving to steer the striping vehicle along the path by interactive response to the monitored video from the camera.

The driver-painting operator is provided with a head worn video monitor having a semi-transparent see-through video monitor display showing the monitored video pattern, so that the roadway is visible and the operator's eyes need not be taken off the roadway in order to see the monitored pattern. This resolves the problem of visibility of the monitor in bright sunlight, when located in a vehicle cab in the prior art systems.

This invention integrates the feature of automatic tracking around curves to provide a one-operator driver-striper system wherein the driver need not guess about the tracking compensation necessary for manipulating the painting vehicle about curves and mentally make steering corrections, but simply steers to match a pointer position with the designated striping pattern path on a video monitor, thereby further avoiding distraction of the driver's attention to the driving function.

A one-operator driver-striper vehicular stripe painting system is thus provided for painting curved stripes precisely tracking and registering with a designated striping pattern curve such as a previously striped pattern on the roadway ahead of the stripe painting gun.

Safer driving is achieved by an automatic tracking alignment system effective about curved striping paths to track in response to the operator steering while following the designated striping pattern curve as presented on a video monitor visible to the operator, while driving for indicating dynamic real-time alignment of a striper vehicle with the designated striping pattern.

An automatically adjustable system for positioning a paint striping device carried by the striper vehicle to correct tracking deviations when steering about painting curved path portions in said designated striping pattern is afforded with different embodiments applicable to articulated and non-articulated striping vehicles.

Other objectives, embodiments and features of novelty will be found throughout the following drawings, claims and description.

BRIEF DESCRIPTION OF THE DRAWINGS

In the accompanying drawings, wherein like features are identified by common reference characters in the different views:

FIG. 1 is a diagrammatic sketch of a highway paint striping system for precisely laying down curved stripes over a desired pattern from a movable paint striping vehicle;

FIG. 2 is a broken away rear-view, looking into a vehicle cab at a video camera monitor and remote electronic paint control panel that permits a single driver to monitor both the highway ahead and to control the paint striping operations being laid down with a painting system moved by the vehicle;

FIG. 3 is a side view fragmental sketch of a paint striping vehicle having an articulation joint between a towing vehicle and a paint striping trailer assembly which automatically adjusts to provide tracking of paint stripes when passing around curves in the striping pattern;

FIG. 7 is a sketch of a video monitor worn as a headpiece by a driver of the painting vehicle to view a semi-transparent video monitor display while looking through the monitor screen along the roadway being painted without taking eyes off the roadway.

THE PREFERRED EMBODIMENT

Figure 4:
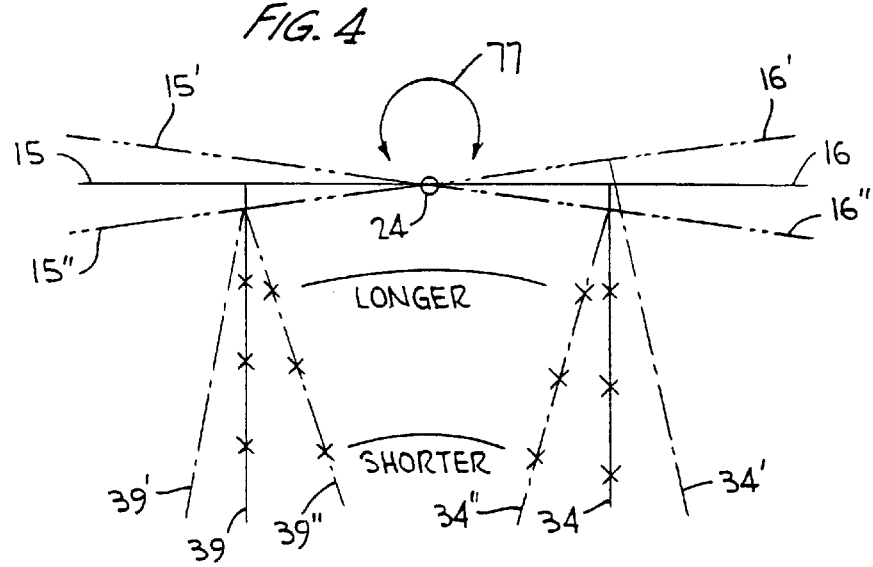
FIG. 4 is a graphic display illustrating the operation of an automatic tracking control embodiment employing an articulated vehicle system.

The disclosures of the parent patents are adopted herein in their entirety by reference, to avoid undue detail and redundancies here in.

As may be seen in FIG. 1, looking downwardly at a roadway being striped, a vehicle 1 is painting a stripe 2 along a roadway as it moves along a curved track pattern 3, typically a previously painted stripe upon which a fresh stripe is to be painted precisely in registration thereover. In typical systems of this type a video camera 4, which may be viewing a pointer system with a pointer located at 10 or otherwise scanning a route along a designated striping pattern 3 to follow an old paint stripe, marker dot patterns, an edge of the road, etc. to provide to the vehicle driver on a video monitor appropriate information for painting a new stripe down the roadway being painted along the designated striping pattern path 3.

Lateral position controls 5 are associated to laterally move the respective front pointer 10, a painting gun 6 and/or the follow up painting gun 7 in a manner that prevents tracking errors when the vehicle 1 is driven about curved striping patterns. Tracking controls may operate either interactively with driver input or automatically. The double headed arrow 8 and the lateral position control framework 6 indicate possible lateral back and forth movements of the respective spaced painting guns, beading guns and pointer in a manner achieving tracking around the curves to precisely deposit new stripes over the designated pattern path. For the straight line type painting systems of the prior art there are no suitable tracking provisions available, and in general the prior art does not resolve the problems of tracking along curved striping patterns to precisely register fresh stripes in place.

In painting over a predetermined striping pattern, it is difficult to track over curved portions of the striping pattern because of dynamic lateral deviations from the desired pattern encountered because of vehicle behavior as the front wheels are turned to the right or left. Thus looking at the example of FIG. 1, the stripe pattern at video camera viewing position is curving differently from the stripes being painted at either the front 6 or rear 5 stripe painting gun positions. Therefore to precisely paint the desired pattern being viewed by the video camera 4 as the vehicle moves down the roadway, the front 6 and rear 5 painting guns, which are located at positions of different curvature along the curved pattern to be painted, may be dynamically moved laterally with respect to vehicle 1 to track, either responsive to steering corrections interactively introduced by the driver when steering to follow the pointer position 10, or by a suitable automated tracking control system, etc.

In FIG. 2, the single operator 14 is driving the painting vehicle along a roadway following stripe pattern 17' as a guide for painting one or more stripes with a following paint striping system. The pointer 39 is kept aligned with the designated stripe path 17 by the steering driver 14 to thereby lay down one or more following stripes from striping guns (not shown). When the pointer 39 is not visible from the cab or is in a position detracting from highway safety conditions, a video camera pointed thereat reproduces a video pattern 44 for visibility by the driver 14 to keep the vehicle on the appropriate path for painting stripes over the designated pattern path 17.

To facilitate the one-person steering and painting operation of highway striping at dynamic painting speeds, a foreward looking video camera may view the pointer and roadway to provide a video picture on monitor 44 for aligning the pointer 39' with the designated roadway stripe 17 by steering the vehicle. This video presentation is calibrated and aligned with the vehicle and stripe painting gun for painting a new stripe in exact registration. In the prior art, the operator must mentally calculate mistracking errors about the curved road sections 17 and compensate by delayed steering corrections. This requires great skill and experience from the driver as well as concentrated mental focus. Mental lapses will introduce significant tracking errors in painting the new stripe, and the required mental effort detracts from driving safety.

The electronic control panel 45 communicates with the painting system for operating the painting gun and paint source controls, typically automatically controlled in response to basic instructions periodically entered at control panel 45, thus permitting the single operator to both drive and control the painting of a stripe pattern as required.

As seen from FIG. 3, the vehicle cab could be articulated, and thus support automatic tracking about curves of known curvature in the striping pattern. Thus schematically, the vehicle is articulated at joint 40, 41, 58, typically as a tractor drive unit 116 and a trailer striping unit 115, thereby to automatically track about curves in the manner described in more detail in the background parent patents as the vehicle moves forward in direction 11.

In this embodiment the vehicle carries the video camera 4 for viewing the frontmost operating station 139, which may constitute either the aforesaid pointer or paint guns for laying down a first layer of two registered stripes. In the case of a striping unit for painting a rear stripe at 134 over one laid down at a leading painting gun station 139, the rear second striping layer will precisely register over the first leading striping layer and track around curves as a function of the articulation joint 58 when the distances from its plane 158 X and Y are equal. Similarly when the forefront unit 115 is steered to align a pointer with the designated path 117 the rear paint gun 134 will precisely track around curves in the track 117.

To allow for differences in truck and trailer dimensions between the respective wheels, while assuring the automatic tracking feature of this invention, both the respective trailer hitch post 40 and tow truck hitch post 41 are telescoped for initial adjustment of the position of the articulation joint 58.

It is seen therefore that with an automated tracking system in operation, the driver only needs to steer the vehicle with the pointer in registration with the designated path 117 and need not detract mental attention away from safe driving to interactively mentally correct tracking errors as a curve is rounded.

The graphical view of FIG. 4 will illustrate the general principle of this automatic tracking feature. Thus by converging and diverging action of racks (1)34 and (1)39 around curves the stripe length between the two racks automatically shortens or lengthens to assure tracking around curves bending in either lateral direction.

With this automatic tracking feature, the shorter and longer painting paths the stripes take at the outer and inner radii of a curved path are automatically compensated for by the converging and expanding postures of the gun racks 134, 139 extending laterally away from the vehicle side in the horizontal mode of articulation 77 about joint 24. This system operates to register a single stripe precisely, with an arc length appropriately automatically adjusted for the sharpness of the curve in the striping pattern. In operation, it is seen for the articulated positions 15', 16', the angle between the extended racks (139, 134) to move from parallel and to diverge or converge outwardly or inwardly from the vehicle 15, 16. In this respect, the shorter paint lines over the arc of curvature are nearest the striper units 15, 16. Likewise for the articulated position 15", 16", the angle converges to paint the longer stripe paths closer to the striper units 15, 16 in the arc of curvature. The parent patents adequately describe such tracking with articulated vehicles.

Figure 5:
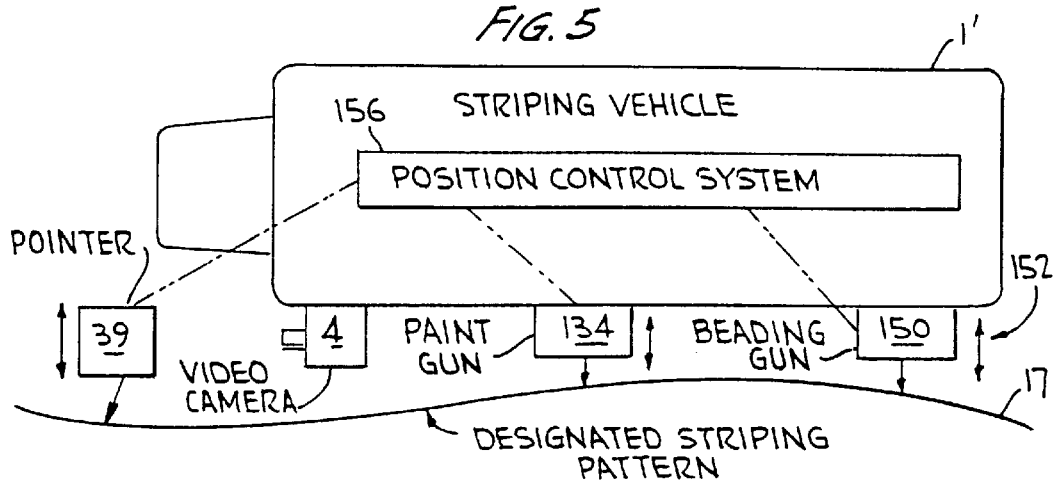
FIG. 5 is a diagrammatic sketch of a further automated tracking system embodiment operable in an un-articulated vehicle employing a conventional movable pointer system controlled by the striping vehicle driver to follow a designated striping pattern.

In FIG. 5, the striping vehicle 1' is illustrated as unarticulated, with the cab on the left pointing along a roadway being striped along a designated striping pattern 17. Known striping systems employ a movable pointer 39 which is controlled in some fashion, such as steering, by the vehicle driver to follow the designated striping pattern 17. Thus a video camera 4 monitors the designated stripe and pointer relationship ahead of the vehicle so that the driver can view the pointer position as seen on a video monitor in the cab to maintain the pointer in registration with the desired striping gun 134 position.

The arrow notation 152 alongside the respective blocks indicates movability of the respective pointer 39, paint gun 134 and beading gun 150 laterally back and forth from a median point calibrated for straight line striping in accordance with the principles of this invention. The feature of coordinating the movements of the pointer 39, gun 134 and beading gun 130 is designated in block diagram form as position control system 156 linked to the controlled elements by dashed phantom lines. This position control system provides automated tracking of newly laid stripes along the designated striping pattern 17 as the vehicle follows curves in the striping pattern. The position control system may be a mechanical system such as described in Mitchell U.S. Pat. No. 3,286,928 for moving painting guns or an equivalent electronic system in a manner readily achieved by those skilled in the art, employing such modifications as taught by the present invention.

Figure 6:
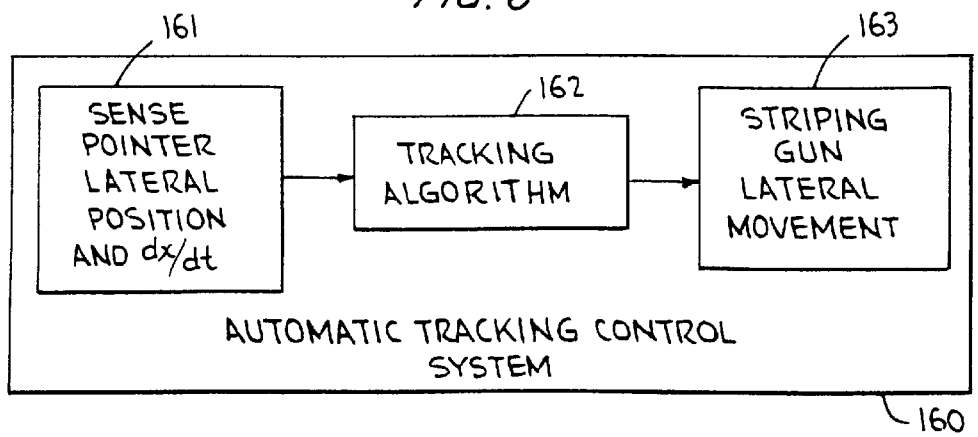
FIG. 6 is a block schematic diagram of an automatic tracking control system embodiment of the invention.

Thus the automatic tracking control system 160 of FIG. 6 permits the single driver-painter to achieve tracking around curves with the sole driver responsibility of keeping the pointer 39 directed along the designated striping pattern when driving without having to mentally become interactively involved in making driving corrections to avoid tracking errors. That materially improves the safety of driving a one-person driver-striper array down a highway.

In the automatic tracking control system 160 the detector 161 senses the pointer lateral position relative to the vehicle and its rate of lateral movement expressed as dx/dt. Then an appropriate tracking algorithm 162 is formulated for laterally moving the paint gun 134 and beading gun 150 in a lateral movement mode for precisely tracking about curved striping patterns. The algorithm of course depends upon the distances between the respective pointer 39, paint gun 134 and beading gun 150, the turning characteristics of the vehicle, the pointer movement characteristics, etc. so that an exemplary algorithm is not particularly meaningful. Of course, if the truck in rounding curves essentially pivots about a point that is midway between the pointer and the paint gun being used, then the behavior is analagous to that portrayed in FIG. 4 for an articulated vehicle.

It is seen therefore that this invention advances the state of the art to provide automated tracking systems that align paint striping guns precisely around curves in a designated striping pattern such as a previously painted stripe along the roadway.

In accordance with a preferred embodiment of this invention, the video monitor screen 44 is embodied in the headset 63 of FIG. 7 as a semi-transparent screen visible to the driver without taking eyes off the roadway. This embodiment offers significant advantages and abolishes the significant disadvantages of video monitoring in bright sunlight conditions 60 by employment of various brightness sunshades on bright days either electronically on the video monitor screen or by introduction of different filters in front of the eyepieces 62, 64. Also the video contrast may be adjusted to a particular driver's preferences electronically by variably selecting darker or lighter monitor contrast of the semi-transparency contrast with the view of the roadway, which to some degree includes variations encountered for example in contrasting cloudy and bright sunlight working conditions. The video image source 61 for this monitoring system is substantially identical with that for the in-cab mount of FIG. 2. These head-harness, see-through, video monitoring systems are well known in the art and are presently commercially available under such brand names as "i-glasses", and as described in U.S. Pat. No. 5,903,395, R. D. Rallison, et al., May 11, 1999 for Personal Visual Display System.

Thus, in accordance with this invention improved paint striping systems for tracking around curved striping patterns encountered by mobile roadway striping vehicles are afforded with video steering control monitors. In particular such video control monitors are worn in a headpiece by a single operator for driving the vehicle and controlling the painting-tracking operation along curved striping patterns.

Having therefore advanced the state of the art with novel features, improved paint striping system performance, and in particular a versatile and safer paint striping system operable by a single person driving the vehicle and operating paint striping controls, those features of novelty relating to the spirit and nature of this invention are defined with particularity in the following claims.

What is claimed is:

1. A one-operator driver-striper vehicular stripe painting system for painting curved stripes along a roadway being striped for precisely tracking a paint striping path on said roadway having a designated striping pattern curve, comprising in combination:
   a striper vehicle carrying a paint striping device comprising a striping gun laterally positionable with the roadway being striped,
   a pointer carried in front of the vehicle for alignment with the designated striping pattern curve by the operator-driver steering the vehicle, and
   tracking alignment means effected interactively as the operator steers the vehicle to keep the pointer in alignment with the designated striping pattern curve, comprising in combination:
   a video monitor device visible to the operator while driving for indicating alignment of the pointer with the designated striping pattern,
   tracking position control means responsive to a tracking algorithm coordinated with characteristics of the striper vehicle and location of the striping device for effecting lateral movement of said striping gun to correct tracking errors, and
   automatically adjustable tracking error correction means responsive to said tracking position control means for positioning the paint striping gun carried by the striper vehicle precisely in register with the designated striping pattern when striping curved paths.

2. The stripe painting system of claim 1 wherein the striping pattern curve is positioned ahead of the vehicle position on said roadway being striped and said video monitor further comprises:
   a steering control monitor displaying a pattern generated by the video camera carried by the vehicle for exhibiting a pattern visible to the operator while driving the vehicle that relatively positions said designated striping pattern with the vehicle position.

3. The stripe painting system of claim 1, wherein said video monitor device further comprises:
   a driver's video monitor headpiece, worn by the operator while driving, including means for displaying a video image semi-transparently on a video screen through which the roadway is visible, said video image configuring said alignment of the striper vehicle with the designated striping pattern.

4. The stripe painting system of claim 3 further comprising brightness and contrast control means on said video monitor device for adjusting monitor visibility of the operator relative to existing roadway brightness conditions.

5. The stripe painting system of claim 4 wherein said brightness and contrast control means further comprises variably selectable eye-shade filter means superimposed over the video screen.

6. The stripe painting system of claim 1 wherein said paint striping vehicle comprises an un-articulated vehicle.

7. An one-operator driver-striper vehicular stripe painting system for painting curved stripes precisely tracking a designated striping pattern curve, comprising in combination:
   tracking alignment means effected interactively as the operator steers along the designated striping pattern curve, comprising a video monitor device visible to the operator while driving for indicating alignment of a striper vehicle with the designated striping pattern,
   automatically adjustable tracking error correction means for positioning a paint striping device carried by the striper vehicle precisely in register with the designated striping pattern when steering about and striping curved paths, said automatically adjustable tracking error correction means further comprising a striper vehicle articulated about a pivot axis, and
   respective striping control instruments extending from the striper vehicle at equally spaced positions fore and aft of the pivot axis.

8. The method of painting stripes upon a receptive roadway surface from a motorized striper vehicle under control of a single driver-painter, comprising the steps of:
   said driver following a first paint stripe pattern on said roadway surface with a tracking mechanism pointer carried by said motorized striper vehicle to identify the position of the first paint stripe when moving along a predetermined curved striping path on the surface,
   thereafter superimposing a second paint stripe with a painting device carried by said motorized striper vehicle in precise registration upon the first paint stripe pattern in the same pass of the motorized striper vehicle along said path by relatively moving the painting device laterally with respect to the position of the first paint stripe identified by the tracking mechanism pointer automatically in a manner compensating for errors in tracking imposed by the path of the motorized striping vehicle around the curves by lateral movement of the painting device responsive to a tracking algorithm coordinated with characteristics of the striper vehicle and location of the painting device on the vehicle.

9. Apparatus for painting stripes upon a receptive surface under control of a single person driving a motorized striper vehicle following a curved paint striping path extending ahead of said vehicle, comprising in combination:
   tracking alignment pointer means carried by said vehicle for following said curved paint striping path when said vehicle moves forward on the receptive surface with said person steering the vehicle to position said pointer for painting stripes in registration with the curved paint striping path, a painting device carried by said vehicle movable laterally with respect to movement of the vehicle along the paint striping path, and automatic tracking error compensation means activated as the vehicle encounters curves in said paint striping path responsive to a tracking algorithm identifying the turning characteristics of the striper vehicle and positioning of said painting device thereon to move said painting device to a lateral position precisely registering a stripe being painted by said painting device upon said paint striping path.

* * * * *